United States Patent
Andersson

[11] Patent Number: 5,971,001
[45] Date of Patent: Oct. 26, 1999

[54] FITTING ASSEMBLY AND METHOD FOR TAPPING INTO A CONDUIT

[75] Inventor: Bo Göran Andersson, Salisbury, Md.

[73] Assignee: Dresser Industries, Inc., Dallas, Tex.

[21] Appl. No.: 08/865,531

[22] Filed: May 29, 1997

[51] Int. Cl.⁶ .............................. F16K 43/00; F16L 41/06
[52] U.S. Cl. ........................... 137/15; 137/318; 73/866.5; 285/197
[58] Field of Search ............... 137/15, 317, 318, 137/315; 285/197; 73/861, 863.81, 863.85, 866.5; 408/87

[56] References Cited

U.S. PATENT DOCUMENTS

| | | | |
|---|---|---|---|
| Re. 35,116 | 12/1995 | Butler et al. ............................. | 137/15 |
| 2,805,273 | 9/1957 | Cuthbert ................................. | 137/317 |
| 2,870,629 | 1/1959 | Willis ...................................... | 137/318 |
| 3,759,100 | 9/1973 | Medwig et al. ..................... | 73/861.81 |
| 3,797,317 | 3/1974 | Peterson, Jr. ........................... | 137/317 |
| 3,930,413 | 1/1976 | Laird et al. ............................. | 137/317 |
| 3,954,288 | 5/1976 | Smith ..................................... | 137/318 |
| 3,983,756 | 10/1976 | Danguillier et al. .................. | 137/317 |
| 4,018,246 | 4/1977 | Langstroth ............................. | 137/318 |
| 4,073,515 | 2/1978 | Perera .................................... | 137/318 |
| 4,078,833 | 3/1978 | Carter .................................... | 285/199 |
| 4,240,459 | 12/1980 | Trautwein ............................. | 137/318 |
| 4,258,941 | 3/1981 | Sands ..................................... | 137/318 |
| 4,331,170 | 5/1982 | Wendell ................................. | 137/318 |
| 4,332,272 | 6/1982 | Wendell ................................. | 137/318 |
| 4,497,332 | 2/1985 | Sewell et al. .......................... | 137/15 |
| 4,649,948 | 3/1987 | Hudson .................................. | 137/318 |
| 4,682,624 | 7/1987 | Turner ................................... | 137/318 |
| 4,801,886 | 1/1989 | Steininger ............................. | 403/256 |
| 4,828,767 | 5/1989 | Smirnoff ................................ | 137/318 |
| 4,840,068 | 6/1989 | Mayhew, Jr. ............................ | 73/730 |
| 4,949,744 | 8/1990 | Heed et al. ............................. | 137/317 |
| 5,030,039 | 7/1991 | Dove ...................................... | 137/318 |
| 5,054,512 | 10/1991 | Jiles ........................................ | 137/318 |
| 5,058,620 | 10/1991 | Jiles ........................................ | 137/318 |
| 5,076,318 | 12/1991 | Fedora ................................... | 137/318 |
| 5,241,981 | 9/1993 | Ahern .................................... | 137/318 |
| 5,312,137 | 5/1994 | Nee ........................................ | 285/14 |
| 5,327,923 | 7/1994 | Eischen et al. ........................ | 137/318 |
| 5,353,831 | 10/1994 | Roth ....................................... | 137/318 |
| 5,396,814 | 3/1995 | Tuttle et al. ............................ | 137/315 |
| 5,425,395 | 6/1995 | Brennan ................................. | 137/318 |
| 5,482,329 | 1/1996 | McCall et al. ......................... | 137/318 |
| 5,524,661 | 6/1996 | Tigerholm ............................. | 137/15 |
| 5,611,365 | 3/1997 | Maichel ................................. | 137/318 |
| 5,612,499 | 3/1997 | Andrew et al. ........................ | 137/318 |
| 5,618,137 | 4/1997 | Hawley et al. ........................ | 137/318 |
| 5,646,352 | 7/1997 | Joseph et al. .......................... | 285/197 |
| 5,659,935 | 8/1997 | Lo-Pinto et al. ....................... | 137/318 |

*Primary Examiner*—George L. Walton
*Attorney, Agent, or Firm*—Haynes and Boone, L.L.P.

[57] ABSTRACT

A fitting assembly and method for attaching to a fluid flow conduit in which a clamp having a threaded port is secured around the conduit. A threaded bushing is inserted into the threaded port and has an axial bore that guides and supports a tool which is inserted through the bore to pierce the corresponding surface of the conduit. After the tool and the bushing are removed from the threaded port, an external component, such as a sensing unit, can be connected to the port to permit access to the fluid for sensing a flow characteristic of the fluid, or the like.

10 Claims, 1 Drawing Sheet

FITTING ASSEMBLY AND METHOD FOR TAPPING INTO A CONDUIT

BACKGROUND OF THE INVENTION

The present invention relates to a fitting assembly and a method for tapping into a fluid flow conduit, and, more particularly, to such an assembly and method which permits access to fluid in the conduit.

When it is desired to add another component, such as a conduit, a measurement device, or the like, to an existing hydraulic equipment installation, one or more fluid flow conduits of the installation must often be replaced which is expensive, time consuming and requires the fluid flow to be shut off. This problem is compounded in installations, such as gasoline service stations, or the like, in which there is limited access to the conduits that connect the fuel dispensers and pumps.

Fitting assemblies have evolved that enable a component to be retro-fitted to a fluid flow conduit. However, these existing assemblies are often costly, bulky and/or complex with a relatively large number of parts. Also, they can be difficult to install and/or are not adaptable to a wide range of installations. Further, in the case of gasoline service stations, these prior art assemblies often cause significant fuel and gasoline vapor losses to the atmosphere.

Therefore, there is a need for a self-tapping fitting assembly of the above type which can easily and quickly be tapped into an existing conduit to enable a component to be connected to the conduit without having to disconnect, break or replace the conduit. There is a further need for a fitting of the above type which can be retrofitted to an existing fluid flow system, yet is cost efficient, and compact. There is a still further need for a fitting of the above type which requires relatively few parts, shorter installation time and enhanced retrofit flexibility, with a minimum of fuel and vapor losses to the environment. There is a still further need for a fitting assembly of the above type which provides efficient interaction between the fluid and the component that is added.

SUMMARY OF THE INVENTION

The present invention, accordingly, provides a system and method which solves the above problems of existing fitting assemblies. To this end, a fitting assembly and method is provided in which a clamp having a threaded port is secured around the conduit. A threaded bushing is inserted into the threaded port and has an axial bore that guides and supports a tool when the tool is inserted through the bore to pierce the corresponding surface of the conduit. After the tool and the bushing are removed from the threaded port, the component to be added is threadably connected into the threaded port and has access to the fluid flowing through the conduit. According to one embodiment of the invention, the component to be added is a sensor which accesses the fluid through the pierced conduit and senses a characteristic of the fluid.

Thus, a major advantage is achieved with the assembly and method of the present invention since the assembly can be retrofitted to an existing fluid flow system, yet is cost efficient and compact. Also, the assembly and method of the present invention requires relatively few parts, shorter installation time and enhanced retrofit flexibility, and, in the case of gasoline service stations, minimizes fuel and vapor losses to the environment. Further, the assembly and method of the present invention permits efficient access to the fluid flowing through the conduit.

DESCRIPTION OF THE PREFERRED EMBODIMENT

Figure 2:
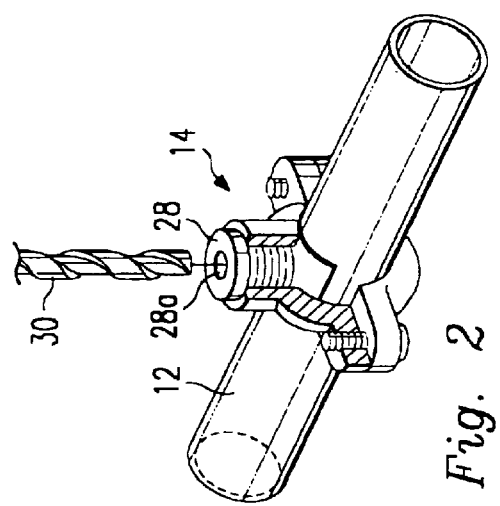
FIG. 2 is an isometric view similar to FIG. 1, but depicting the fitting assembly of FIG. 1 connected to a fluid flow conduit.
Figure 1:
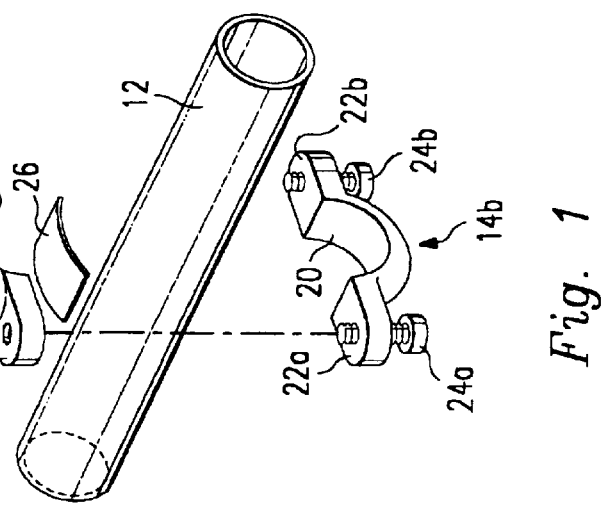
FIG. 1 is an isometric, exploded view of the fitting assembly of the present invention.

Referring to FIGS. 1 and 2 of the drawings, the reference numeral 10 refers, in general, to the fitting assembly of the present invention which is designed to clamp around a conduit 12 containing fluid, such as gasoline, gasoline vapor and/or the like. The assembly 10 includes a clamp assembly 14 having a member 14a and a member 14b which together extend around the outer circumference of a selected section of the conduit 12.

The clamp member 14a is formed by a body member 16 having a threaded port 16a extending therethrough, and two flanges 18a and 18b extending from diametrically opposed sides thereof. The lower surface of the body member 16, as viewed in FIG. 1, defines a concave surface that corresponds to the curvature of the corresponding portion of the conduit 12 (which in the example illustrated is the upper portion).

The clamp member 14b is formed by a curved plate 20 defining a concave surface corresponding to the curvature of the corresponding lower portion of the conduit 12. A pair of flanges 22a and 22b extend from opposed sides of the plate 20. The flanges 18a and 22a, as well as the flanges 18b and 22b, have respective openings that align when the clamp member 14a and the clamp member 14b are placed around the corresponding surface of the conduit 12 as shown in FIG. 2. A bolt 24a extends through the aligned openings 18a and 22a, and a bolt 24b extends through the aligned openings 18b and 22b to secure the clamp assembly 14 over the corresponding circumferential portion of the conduit 12. A gasket 26 extends between the concave surface of the body member 16 and the corresponding surface of the conduit 12 when the clamp assembly 14 is in its clamped position of FIG. 2, thus providing a compression seal on the conduit.

A threaded bushing 28 is provided that is designed to extend in the port 16a in threaded engagement therewith. An axial bore 28a extends through the bushing 28 and has a diameter that is less than the diameter of the port 16a and is adapted to receive a drill bit 30 with a minimum of clearance. A drill (not shown) is then utilized to apply a sufficient amount of torque to the drill bit 30 to drill through the corresponding surface of the gasket 26 and the conduit 12 while the drill bit 30 is guided and supported in the bore 28a.

After the conduit 12 is pierced in the above manner, the drill bit 30 is removed from the bushing 28 and the bushing is removed from the port 16a. Thus, access to the fluid flowing through the conduit 12 is provided through the port 16a and the pierced openings in the gasket 26 and the conduit 12, permitting a component, such as a conduit, a measuring device, or the like to be connected to the port 16a.

Figure 4:
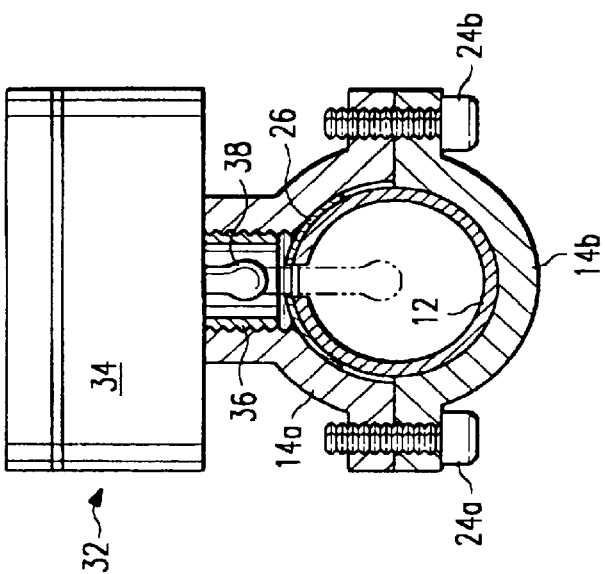
FIG. 4 is a cross-sectional view of the fitting assembly and the installed sensing unit of FIG. 3.
Figure 3:
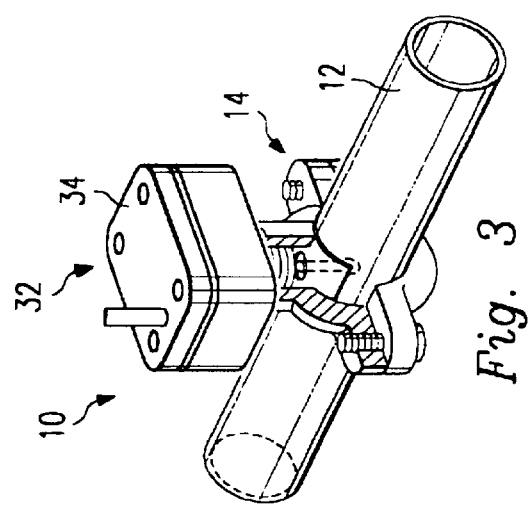
FIG. 3 is a view similar to FIG. 2 but depicting a sensing unit installed on the fitting assembly of FIGS. 1 and 2.

For the purpose of example, it will be assumed that it is desired to measure a characteristic of the fluid flowing through the conduit. To this end, a sensing unit, shown in general by the reference numeral 32 in FIGS. 3 and 4, is attached to the assembled clamp assembly 14. The sensing unit 32 is provided with a housing 34 in which electrical components (not shown) used in the sensing operation are disposed. Since these electrical components are conventional, they will not be described in any detail.

An externally threaded sleeve 36 projects downwardly from the housing 34, as viewed in FIGS. 3 and 4, and can be formed integrally with the housing or attached to the housing in any known manner. The sleeve 36 is sized so that it threadedly engages the port 16*a* of the body member 16 of the clamp member 14*a*. A probe 38 extends from the housing 34 and into the axial bore (FIG. 4) of the sleeve 36. The end of the probe 38 is located in the latter bore just above the pierced opening in the conduit 12. In this manner, the fluid from the conduit 12 permeates into the bore of the sleeve 36 and into contact with the probe 38. The probe 38 can be of a conventional design and, as such, is adapted to sense or measure one or more characteristics of the fluid flowing through the conduit 12. For example, the assembly 10 of the present invention is well suited to be installed on a vapor return conduit forming a portion of a gasoline dispensing/vapor recovery system such as the system disclosed in pending application Ser. No. 08/696,167 filed on Aug. 13, 1996, and assigned to the assignee of the present invention. In the latter environment, the probe 38 would be adapted to sense the amount of vapor flowing through the conduit 12 or, alternatively, the amount of oxygen in the air/vapor mixture flowing through the conduit.

In operation, the clamp assembly 14 is secured around the conduit 12 in the manner described above, with the gasket 26 extending between the clamp member 14*a* and the conduit. The threaded bushing 28 is then inserted into the relatively large-diameter port 16*a* of the body member 16 in threaded engagement therewith. A portion of the drill bit 30 is then inserted through the relatively small-diameter axial bore 28*a* of the bushing 28 with a minimum of clearance so that the drill bit is guided and supported in the latter bore. The drill bit 30 is used in the manner described above to drill a hole through the gasket 26 and the conduit 12, after which the drill bit is removed from the bushing 28, and the bushing is removed from the port 16*a*. Assuming that it is desired to sense a characteristic of the fluid flowing through the conduit 12, the threaded sleeve 36 of the sensing unit 32 is then inserted into the port 16*a* in threaded engagement therewith with the distal end of the probe 38 extending just above the pierced opening in the conduit 12. In this manner, the fluid from the conduit 12 permeates into the bore of the sleeve 36 and into contact with the probe 38 to enable the probe to sense a characteristic of the fluid in the conduit. The sensing unit 32 can be connected, in any known manner, to a control or recording system (not shown) for responding to the fluid characteristic sensed or measured by the probe 38, in any conventional manner.

The present invention thus enjoys several advantages. For example the threaded bushing 16 fits into the same-sized opening as the sensing unit 34 yet has a relatively small-diameter bore 16*a* for receiving the drill bit 30. The diameter of the bore 16*a* can be selected so that the drill bit 30 extends through the bore with a minimum of clearance and is thus guided and supported in the bore during the drilling operation. Also, the probe 38 is located outside the conduit 12 and thus does not interfere with the fluid flow through the conduit.

Also, the assembly of the present invention can be retrofitted to an existing fluid flow system, yet is cost efficient, and compact. Further, the assembly and method of the present invention requires relatively few parts, shorter installation time and enhanced retrofit flexibility, and minimizes fuel and vapor losses to the environment. Still further, the assembly and method of the present invention permits efficient interaction between the fluid and the sensor, or similar device.

It is understood that variations may be made in the foregoing without departing from the scope of the present invention. For example, rather than connect the sensing unit 34 to the port 16*a*, a conduit (not shown) having an externally threaded end portion can be secured to the port to divert at least a portion of the flow from the conduit 12. Also, as shown by the dashed lines in FIG. 4, the probe 38 can project downwardly through the sleeve 36, through the above-mentioned opening in the conduit 12 and into the interior of the conduit in the path of the fluid flowing through the conduit. Also the type of sensing unit, or probe, can vary within the scope of the invention, and can include a detector, and/or any type of fluid measuring device. Also, the drill bit used in the example described above can be replaced with a punch, or the like, for piercing the corresponding surface of the conduit. Of course, different bushings having bores with different diameters can be provided to accommodate drill bits, or other piercing, or punching, devices with different diameters.

It is understood that other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A fitting assembly for tapping into a conduit containing fluid, the assembly comprising:

a body member connected to the conduit and having a threaded bore;

a bushing having an externally threaded surface of a diameter corresponding to the diameter of the bore so that the bushing can be removably inserted into the bore in threaded engagement therewith;

the bushing having an axial bore extending perpendicular to the conduit for receiving a tool for piercing the corresponding surface of the conduit so that the bore of the body member communicates with the interior of the conduit; and a sensing unit comprising:

a first portion having an externally threaded surface of a diameter corresponding to the diameter of the threaded bore of the body member so that it can be inserted into the latter bore in threaded engagement therewith after the bushing has been removed from the bore, and a second portion extending into the body member and communicating with the conduit through the pierced surface for sensing a characteristic of the fluid.

2. The assembly of claim 1 wherein the sensing unit further comprises a housing that rests on a surface of the body member, the first portion of the sensing unit being in the form of a sleeve extending from the housing, and the second portion of the sensing unit being in the form of a sensing element extending from the housing and into the sleeve.

3. The assembly of claim 2 wherein the sensing element extends into the sleeve in a spaced relation to the pierced surface.

4. The assembly of claim 1 wherein the bore of the bushing has a diameter of a size relative to that of the tool so that the bushing guides the tool during the piercing yet permits free movement of the tool into and from the bore.

5. The assembly of claim 1 wherein the body member comprises a first clamp member extending around a portion of the conduit and having the threaded bore, and a second clamp member extending around the remaining portion of the conduit, the first clamp member being connected to the second clamp member to secure the body assembly to the conduit.

6. The assembly of claim 5 wherein each clamp member comprises an arcuate member extending around a corresponding portion of the conduit, and a flange extending from the arcuate member, and further comprising a bolt extending through the respective flange members of the arcuate members to connect the arcuate members and secure the body member to the conduit.

7. The assembly of claim 1 wherein the bushing extends for the entire length of the bore of the body member.

8. A method for fitting a sensing unit to a conduit so that the sensing unit has access to fluid flowing through the conduit, the method comprising the steps of:

connecting a body member to the conduit;

inserting a bushing in a bore formed though the body member;

guiding a tool in a bore formed through the bushing;

piercing the corresponding surface of the conduit with the tool during the step of guiding so that both of the bores communicate with the interior of the conduit;

removing the tool from the bore of the bushing;

removing the bushing from the bore of the body member; and inserting a portion of the sensing unit into the bore of the body member so that a sensing element of the sensing unit communicates with the interior of the conduit through the pierced surface and senses a characteristic of the fluid.

9. The method of claim 8 further comprising the steps of threading the bore of the body member, and providing corresponding external threads on the bushing and on the portion of the sensing unit so that they each can threadedly engage the bore of the body member.

10. The method of claim 8 wherein the portion of the sensing unit includes a threaded member and wherein the sensing element of the sensing unit extends in the threaded member, and further comprising the step of maintaining the sensing end of the sensing element in communication with the conduit through the pierced surface of the conduit.

* * * * *